United States Patent [19]

McShan

[11] 3,745,485

[45] July 10, 1973

[54] ELECTROACOUSTIC SURFACE WAVE TIMING SYSTEM

[76] Inventor: Clarence H. McShan, 21 Bluff Point Road, Northport, N.Y. 11768

[22] Filed: Aug. 13, 1971

[21] Appl. No.: 171,706

[52] U.S. Cl. .......... 331/107 A, 330/5.5, 331/116 R, 333/30

[51] Int. Cl. .......... H03b 5/30

[58] Field of Search .......... 330/5.5; 333/30; 331/107 A

[56] References Cited

UNITED STATES PATENTS

| | | | |
|---|---|---|---|
| 3,551,837 | 12/1970 | Speiser et al. | 330/5.5 |
| 3,568,102 | 3/1971 | Tseng | 331/107 A |
| 3,633,118 | 1/1972 | Means | 331/107 A |
| 3,633,132 | 1/1972 | Hartemann | 330/30 R |

OTHER PUBLICATIONS

Applied Physics Letter, R. M. White, pages 314–316, Dec. 15, 1965

*Primary Examiner*—John Kominski
*Attorney*—Laurence J. Marhoefer

[57] ABSTRACT

Two or more circulating waves are maintained in a nondispersive electroacoustic surface wave delay medium. The periodicity or circulating frequency of each wave is related respectively to a different multiple of common wave length and an exact multiple relationship is maintained by cross-synchronization between delay paths. Periodic coincidence between or among the waves produces an output signal whose period may be in seconds or minutes if desired.

5 Claims, 2 Drawing Figures

PATENTED JUL 10 1973 3,745,485

CLARENCE HUNTER McSHAN

INVENTOR.

ELECTROACOUSTIC SURFACE WAVE TIMING SYSTEM

BACKGROUND OF THE INVENTION

This invention relates to an electroacoustic surface wave timing system and more particularly to a novel electroacoustic surface wave oscillator whose low power requirements, simplicity and compactness make it particularly well adapted for precision, low cost, clocks and wrist watches.

Stable frequency sources such as mechanical resonators and piezoelectric crystals for various reasons are not suited to very low frequency operation. When space is restricted, it is common practice to use a high frequency resonator and divide the frequency down to the desired value. For best accuracy, quartz crystals in the range of 3 to 5 megaHertz are preferred. However, power consumption of the dividing circuits is excessive for small battery powered watch applications. Furthermore, these crystals must be carefully supported in a sealed case, if long term stability is to be considered. These supports present problems of drift and shock resistance. Space and power problems necessarily increase the size of a crystal watch to unappealing dimensions. A portable time standard of this type exposed to temperature changes, voltage variations and shock makes drift and abrupt changes in frequency a major problem limiting present design accuracy to about 30 seconds per year (1 PPM).

SUMMARY OF THE INVENTION

The objects of this invention include:

a. the provision of a very small crystal oscillator which has a low effective output frequency;
b. the elimination of a major source of drift and shock in crystal oscillators by eliminating the need to support the crystal by its electrode leads;
c. the provision of a low frequency crystal oscillator which employs a thin uncased crystal, facilitating utilization in a watch;
d. the provision of a crystal oscillator with a zero temperature coefficient in the vicinity of 25°C, and which may be adjusted in the positive or negative direction to compensate external effects;
e. the reduction of circuit complexity by many times that required by the prior art frequency divider approach;
f. the reduction of power requirements by using pulsed circuits with 0.2 percent duty cycle;
g. the provision of a system capable of generating one pulse per second, using 3 to 4 microwatts power confined in size to 0.01 cubic inch package.

Briefly, this invention contemplates a low frequency oscillator in which two or more cross-synchronized electroacoustic surface waves of the same wave length circulate in delay paths which differ from one another by an integral number of wave lengths. The wave length is proportional to the product of the number of wave lengths in each delay path so that the circulating waves periodically simultaneously reach a predeterimined point along their respective delay paths. A circuit responsive only to this simultaneous occurrence provides the low frequency output signal.

BRIEF DESCRIPTION OF THE DRAWINGS

Having briefly described this invention, it will be described in greater detail along with other objects and advantages in the following detailed description of a preferred embodiment which may be best understood by reference to the accompanying drawings which form part of the instant specification.

0.851 inch long
0.156 inch wide and
0.020 inch thick

DESCRIPTION OF THE INVENTION

Figure 1:
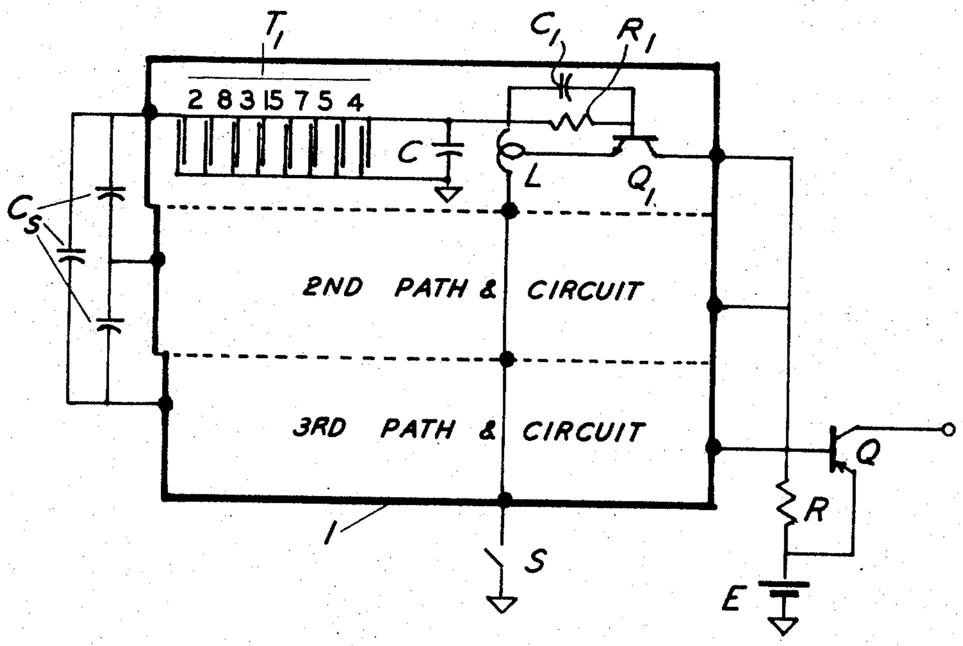
FIG. 1 is a schematic showing one embodiment of an oscillator constructed in accordance with the teachings of this invention.

FIG. 1 shows one example of the invention. As this system is described, various characteristic values will be given to show the practical and noncritical nature of the invention. Use is made of a piezoelectric substrate 1 made of alpha quartz unterminated at either of its ends. The substrate has three functions: (1) it enables an electroacoustic energy conversion, (2) provides an acoustic surface wave delay path along its X axis and (3) the backside of the crystal may be used to mount or deposit associated circuits.

In the illustrated embodiment of the invention three distinct electroacoustic waves circulate on the surface of the crystal 1. Energy is coupled to and from the crystal by three interdigital transducers $T_1$, $T_2$, $T_3$. Each transducer comprised of eight sets of electrodes is deposited on the substrate surface in a manner well known to those skilled in the art. Each transducer serves both to launch and detect returning waves reflected back from unterminated ends of the delay line. Transducers $T_1$, $T_2$ and $T_3$ are coupled respectively to separate drive circuits (only one of which is shown in FIG. 1). In the illustrative embodiment, the 2nd and 3rd drive circuits are identical to that shown. Each comprises a transistor $Q_1$, an inductor L and a capacitor C. One end of inductor L is coupled to ground via switch S and the emitter of transistor $Q_1$ is coupled to a centertap of inductor L. An r-c network comprising resistor $R_1$ and capacitor $C_1$ coupled to the base of $Q_1$ serve as a conventional time constant circuit, reducing the switching time of $Q_1$ and limiting the base current. Resistor R couples the collector of transistor $Q_1$ to the supplied voltage E. All ground connections shown in the drawing are common connections. A pulse from a drive circuit is coupled to its respective transducer and the transducer launches a pattern of eight waves which propagate in both directions along the delay path. Patterns reflected back will have reversed patterns relative to that of the transducer. The electrode sets for each transducer are spaced 2 – 8 – 3 – 15 – 7 – 5 and 4 wave lengths apart so that no more than two waves of the first reflected pattern will match the electrode positions at a given time. For example, when the wave launched from the extreme right hand pair of electrodes reaches the extreme left hand pair of electrodes of transducer $T_1$ following reflection from the right hand end of the crystal, the wave launched from the pair of electrodes adjacent the right hand end pair will not coincide with the pair of electrodes adjacent the left hand pair due to the spacing of the electrodes. Hence the transducer output in response to the reversed patterns will be about 18% of that for matched patterns. The transducer must be located such that the two reversed patterns pass through the transducer sequentially to obtain this signal ratio. That is to say, preferably the pattern reflected from the right hand end of the crystal should not pass through the transducer at the same time the pattern reflected from the left hand end is passing through the transducer. To accomplish this, the transducer should be positioned near one end of the path, as shown, within 40 percent of the entire path length so that the two sets of reverse patterns traveling in opposite directions pass through the transducer one-at-a-time. The drive circuit is sufficiently back-biased to be nonresponsive to this low level signal. In the illustrative embodiment shown, the characteristic offset voltage of the base of the transistor $Q_1$ is used to sufficiently back-bias $Q_1$ below cutoff to prevent its triggering by the low level energy (18 percent approximately) generated by a once reflected pattern.

After the second reflection, the wave pattern and transducer pattern will match and the transducer will produce one strong pulse capable of triggering the drive circuit. Response only to a round-trip signal has two advantages. First, the round-trip rate is independent of the transducer position along the line and secondly, the delay time is doubled for a given crystal length.

Each of the three delay paths is a different length; in the particular embodiment shown here, each path length differs by an incremental amount of two wave lengths. The round-trip paths are a whole number of wave lengths long.

In order to design a system which produces an output pulse every $K$ seconds it is convenient to use the following formula:

Wave length $= K/v.N_1.N_2.N_3 \ldots N_n$ where $v$ is the propagation velocity of the surface wave in terms of time per unit length (this is 8.00 milliseconds per inch for an ST cut quartz crytal) and N is the number of wave lengths desired in each round-trip path. It should be noted that the number of wave lengths N in any paths should not have a common factor. Conveniently, where three paths are used the number of wave lengths in at least two can be selected to be prime numbers.

Figure 2:
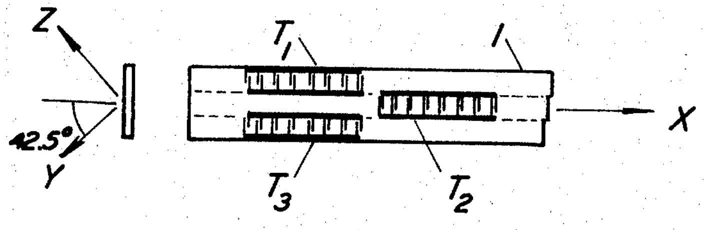
FIG. 2 is a drawing, roughly to scale, of a practical embodiment of the invention measuring.

Investigation shows many practical designs are possible. For example to produce one output pulse per second ($K = 1$) with three delay paths, let $N_1 = 277$, $N_2 = 273$ and $N_3 = 269$. This makes the wave length 0.00615 inch. The longest line will be 0.851 inch and the others are each shorter by 0.0123 inch. The transducer is just under 45 wave lengths long or 0.276 inch and each may be positioned as shown in FIG. 2 to meet the reversed sequential requirements, which, of course, requires the transducer to be less than 40 percent of the crystal length. Preferably the transducers $T_1$, $T_2$ and $T_3$ are respectively all disposed on an even number of half wave lengths from the ends of the crystal so has to have the reverse matching signals in phase.

Since it is not possible to physically make the paths an exact whole number of wave lengths, it is necessary to use cross-synchronization to correct small errors. A sufficient amount of cross-coupling between each of the drive circuits is provided by capacitive coupling $C_s$. This synchronization process occurs each time pulse coincidence occurs between any two drive circuits. A line having a slow error will be speeded up and a fast line will be slowed down. The three line rates will take an average correction which enables whole number values to be met.

The output signal is obtained by selecting a value for R such that only the three combined pulse currents produces a gate signal large enough to gate on transistor Q.

To start the system operating, close switch S. This applies a charge stored in C and in the transducer electrode capacity across L which then triggers $Q_1$. The radiation resistance of the transducer (about 100 ohms) shunts L and C and damps the drive circuit sufficiently so that only one pulse is launched. Thereafter, the circulating signals trigger the drive circuit. The Q factor of L and C must be high (160 for example) with C about 10 pf and L about 6 uH to provide an L-C impedance of about 128,000 ohms in a typical embodiment of the invention for producing one output pulse per second from a small crystal. This high impedance compared to the radiation resistance prevents loading of the transducer and attenuation of the circulating waves. This quality inductor is obtainable with a ferrite toroidal core 0.125 inch diameter and may be easily mounted on the crystal.

Because of the low coupling coefficient of an ST cut quartz, the lowest possible operating voltage E may be insufficient to start the system operating. There are two alternate ways of starting the system: (1) use a larger supply voltage or (2) apply an external pulse to the drive circuits. Once started, the drive circuits are capable of maintaining the wave amplitudes because of the low attenuation coefficient (0.016 percent).

Although the present invention has been described with reference to a specific embodiment, it will be appreciated that a variety of changes may be made without departing from the scope of the invention. For example, certain features may be used independently and equivalents may be substituted.

What is claimed is:

1. An oscillator comprising a surface wave means for producing at least two circulating waves in a delay medium whose repetition frequencies are inversely related to a whole number of wave lengths as determined by each delay path, each of said delay paths differing in length from each other delay path by a whole number of wave lengths, means for cross-synchronizing said circulating waves to maintain said whole number relationship exactly and means responsive only to the periodic coincidence of each pulse at a predetermined point along its delay path respectively to produce a low frequency output.

2. An oscillator comprising a delay media with at least two delay paths, each path having a transducer for launching and detecting a pattern of surface waves, a drive circuit connected to each transducer for generating a pulse to energize said transducer to launch a pattern of surface waves, said circuit responsive to returning wave patterns corresponding to the transducer electrode pattern only to trigger a pulse to reenforce said surface wave pattern each time they make a round-trip on said delay path, each path length being different by a predetermined number of half wave lengths and each said round-trip path being a different predetermined number of whole wave lengths $N_1$, $N_2$, $\ldots$ $N_n$, each transducer adapted to launch a pattern having the same wave length whereby all pulse circuits will pulse at the same time periodically, an output means which is responsive only to all N pulses occurring at the same time to produce a low frequency pulse output, and means cross-coupling said drive circuits and their delay paths to synchronize the system to an exact whole number N relationship whereby the output rate is as accurate as said round-trip rates.

3. An oscillator as in claim 2, where said delay media is an ST cut quartz crystal with a low temperature coefficient.

4. An oscillator as in claim 2, said transducer pattern such that only a corresponding signal pattern occurring each round trip triggers the drive circuits.

5. An oscillator as in claim 3, said delay paths are unterminated to cause the wave patterns to reflect back and forth along the mechanical axis of the crystal.

* * * * *